US012669701B2

(12) United States Patent
Xiao

(10) Patent No.: US 12,669,701 B2
(45) Date of Patent: Jun. 30, 2026

(54) OPTICAL APPARATUS AND HEAD-MOUNTED DEVICE

(71) Applicant: BEIJING UNICORN TECHNOLOGY CO., LTD., Beijing (CN)

(72) Inventor: Bing Xiao, Beijing (CN)

(73) Assignee: BEIJING UNICORN TECHNOLOGY CO., LTD., Beijing (CN)

( * ) Notice: Subject to any disclaimer, the term of this patent is extended or adjusted under 35 U.S.C. 154(b) by 786 days.

(21) Appl. No.: 17/907,669

(22) PCT Filed: Mar. 17, 2021

(86) PCT No.: PCT/CN2021/081209
§ 371 (c)(1),
(2) Date: Mar. 7, 2023

(87) PCT Pub. No.: WO2021/197062
PCT Pub. Date: Oct. 7, 2021

(65) Prior Publication Data
US 2023/0194858 A1      Jun. 22, 2023

(30) Foreign Application Priority Data
Mar. 31, 2020    (CN) ......................... 202010241548.0

(51) Int. Cl.
*G02B 27/00*        (2006.01)
*G02B 27/01*        (2006.01)
*G02B 27/28*        (2006.01)

(52) U.S. Cl.
CPC ..... *G02B 27/0025* (2013.01); *G02B 27/0172* (2013.01); *G02B 27/283* (2013.01); *G02B 27/286* (2013.01)

(58) Field of Classification Search
CPC ............ G02B 27/0025; G02B 27/0172; G02B 27/283; G02B 27/286; G02B 5/3083; G02B 2027/0178
See application file for complete search history.

(56) References Cited

U.S. PATENT DOCUMENTS 5,596,451 A      1/1997  Handschy et al.
2017/0227770 A1*  8/2017  Carollo .............. G02B 27/0172
(Continued)

FOREIGN PATENT DOCUMENTS

CN          107589546 A      1/2018
CN          108572457 A      9/2018
(Continued)

OTHER PUBLICATIONS

The Notice of Rejection received in the corresponding Japanese Application 2022-560011, mailed Nov. 6, 2023.
(Continued)

*Primary Examiner* — George G. King
*Assistant Examiner* — Natasha Nigam
(74) *Attorney, Agent, or Firm* — K&L Gates LLP

(57)          ABSTRACT

Embodiments of this specification provide an optical apparatus and a head-mounted device. The optical apparatus may include an image assembly, a first optical assembly, a second optical assembly, and a third optical assembly, the image assembly is configured to emit image light. The image assembly, the first optical assembly, the second optical assembly, and the third optical assembly are configured to enable that the image light is transmitted through the first optical assembly to the second optical assembly, then reflected through the second optical assembly to the third optical assembly, then reflected through the third optical assembly back to the second optical assembly and transmitted through the second optical assembly into a user's eye.

(Continued)

The second optical assembly is configured to block interference light incident on the second optical assembly from entering the user's eye. The third optical assembly is configured to block the image light from being transmitted through the third optical assembly to enter an external environment.

20 Claims, 7 Drawing Sheets

(56)                References Cited

U.S. PATENT DOCUMENTS

| 2019/0025602 | A1 |   | 1/2019  | Qin et al. |              |
|--------------|----|---|---------|------------|--------------|
| 2019/0155031 | A1 |   | 5/2019  | Dausmann   |              |
| 2020/0348521 | A1 | * | 11/2020 | Xiao       | G02B 27/017  |
| 2021/0199969 | A1 | * | 7/2021  | Chen       | G02B 27/286  |

FOREIGN PATENT DOCUMENTS

| CN | 108681073   | A | * | 10/2018 | ......... G02B 27/0172 |
|----|-------------|---|---|---------|------------------------|
| CN | 207946601   | U |   | 10/2018 |                        |
| CN | 110286489   | A | * | 9/2019  | ......... G02B 27/0172 |
| CN | 209542958   | U | * | 10/2019 |                        |
| CN | 110927970   | A |   | 3/2020  |                        |
| CN | 111158154   | A |   | 5/2020  |                        |
| CN | 111273449   | A |   | 6/2020  |                        |
| CN | 111290125   | A |   | 6/2020  |                        |
| CN | 111399224   | A | * | 7/2020  | .......... G02B 27/286 |
| KR | 20190137161 | A |   | 12/2019 |                        |
| WO | 2019154426  | A1 |  | 8/2019  |                        |
| WO | WO-2019154432 | A1 | * | 8/2019 | ......... G02B 27/0172 |

OTHER PUBLICATIONS

The Extended European Search Report received in the corresponding European Application 21780951.6, mailed Aug. 31, 2023.

International Search Report mailed in International Application PCT/CN2021/081209 on May 31, 2021.

The Final Rejection received in the corresponding Chinese Application 202010241548.0, mailed Oct. 20, 2022.

Chapter 5 Electrostatic Induction and Electromagnetic Protection, p. 135-140 of "TV Principles and Maintenance", published Aug. 31, 2006.

Liu, Jianying, p. 373-375 of "Fundamentals of Digital Electronics", published Jul. 31, 2006.

The First Office Action received in the counterpart Korean application 10-2022-7038107, mailed on Oct. 18, 2024.

* cited by examiner (1)                                          (2)

200B

| Image light |
| Interference light |
| Ambient light |

102a

104a

104b 108a 108b

110

106a

106b

106c

300

301

200A

Optical apparatus

OPTICAL APPARATUS AND HEAD-MOUNTED DEVICE

CROSS REFERENCES TO RELATED APPLICATIONS

This application is a National Stage of International Application No. PCT/CN2021/081209, filed Mar. 17, 2021, entitled "OPTICAL APPARATUS AND HEAD-MOUNTED DEVICE," which claims priority to Chinese Patent Application No. 202010241548.0, filed Mar. 31, 2020, entitled "OPTICAL APPARATUS AND HEAD-MOUNTED DEVICE," both of which are hereby incorporated by reference in their entireties for all purposes.

FIELD

Embodiments of the Specification relate to the technical field of optics, and more particularly, to an optical apparatus and a head-mounted device.

BACKGROUND

With the development of optical technology and other technologies (e.g., computer technology, etc.), a user may perceive a virtual image or a real scene, etc. through various devices including optical apparatuses. For example, a typical application is the augmented reality (AR) technology, which generally refers to a technology that uses information provided by computer technology to enhance a user's perception of a real scene. In particular, in the AR technology, virtual information may be applied to a real world by using computer technology, that is, a real scene and a virtual image (e.g., a virtual object, a virtual scene, etc.) may be superimposed on a same screen in real time, so that human eye may view a mixed image of the real scene and the virtual image at the same time, thereby achieving an AR effect.

Currently, this type of device is still in development, and it is easy to cause a bad user experience.

SUMMARY

Embodiments of this specification provide an optical apparatus and a head-mounted device for the related art.

In an aspect, embodiments of this specification provide an optical apparatus including an image assembly, an first optical assembly, an second optical assembly, and an third optical assembly, and the image assembly is configured to emit an image light. The image assembly, the first optical assembly, the second optical assembly, and the third optical assembly are configured to enable that the image light is transmitted through the first optical assembly to the second optical assembly, then reflected through the second optical assembly to the third optical assembly, then reflected back through the third optical assembly to the second optical assembly and transmitted through the second optical assembly into the user's eye. The second optical assembly is configured to block interference light incident on the second optical assembly from entering the user's eye. The third optical assembly is configured to block the image light from being transmitted through the third optical assembly into an external environment.

In another aspect, embodiments of this specification provide a head-mounted device including the optical apparatus described above, wherein the head-mounted device has a helmet shape or an eyeglass shape.

In the embodiments of this specification, since the second optical assembly blocks the interference light from entering the user's eye, the interference of the interference light to the image light and the ambient light can be avoided, and the imaging quality can be improved. In addition, since the third optical assembly blocks the image light incident thereon from being transmitted through the third optical assembly into the external environment, the leakage of the image light to the external environment can be avoided, and the user's privacy can be effectively protected.

BRIEF DESCRIPTION OF THE DRAWINGS

The above and other objects, features and advantages of embodiments of this Specification will become more obvious based on the more detailed description of the drawings on the embodiments of this specification, wherein like drawing marks generally represent like elements throughout the embodiments of this specification.

Figure 1A:
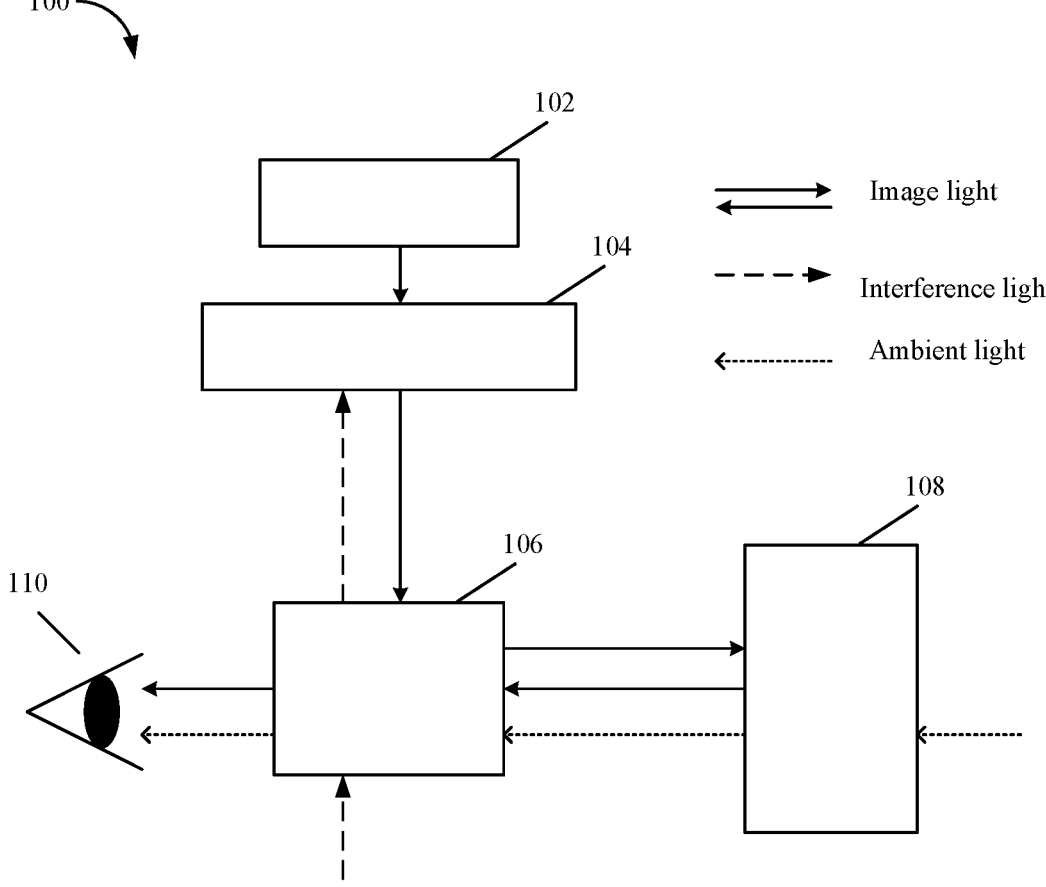
FIG. 1A is a schematic structural diagram of an optical apparatus according to an embodiment.

| List of reference numerals: |
| --- |
| 100: Optical apparatus |
| 102: image assembly |
| 104: First optical assembly |
| 106: Second optical assembly |
| 108: Third optical assembly |
| 110: User's eye |
| 102a: Image source |
| 102b: Lens |
| 104a: First polarizer |
| 104b: First wave plate |
| 106a: Second wave plate |
| 106b: Polarization beam splitter |
| 106c: Linear polarization element |
| 108a: Transflective element |
| 108b: Circular polarization element |
| 200A: Optical apparatus |
| 200B: Optical apparatus |
| 200C: Optical apparatus |
| 300: Head-mounted device |
| 301: Housing |

DETAILED DESCRIPTION

The subject matter described herein will now be discussed with reference to various embodiments. It is to be understood that these embodiments are discussed merely to enable those skilled in the art to better understand and implement the subject matter described herein and are not intended to limit the scope, applicability, or examples set forth in the Claims. Changes may be made in the function and arrangement of the elements in question without departing from the scope of protection of the Claims. Various embodiments may omit, replace, or add various procedures or components as necessary.

As used herein, the term "including" and variants thereof denote open-ended terms with the meaning "including but not limited to". The term "based on" means "based at least in part on". The terms "an embodiment" and "an embodiment" mean "at least an embodiment". The term "another embodiment" means "at least one other embodiment". The terms "first", "second", and the like may refer to different or the same targets. Other definitions may be included below, whether express or implied. A definition of a term is consistent throughout this Specification unless the context clearly indicates otherwise.

In this Specification, the terms "center", "top", "bottom", "left", "right", "perpendicular", "parallel", "inside", "outside", etc. indicate an orientation or positional relationship based on the orientation or positional relationship shown in the drawings, which are for convenience of description only and do not imply that devices, components or elements must have a specific orientation or are constructed and operated in a specific orientation. Therefore, such terms shall not limit the scope of the technical solution of this Specification.

Currently, users can perceive virtual images or real scenes, etc. through various apparatuses including optical apparatuses. However, such apparatuses are still in development, resulting in poor user experience. For example, in addition to the image light generated by the optical apparatuses and the ambient light of the external environment, interference light may enter human eye through the optical apparatuses, resulting in poor imaging effect of the optical apparatuses and confusion of image contents. In addition, the image light may enter the external environment through the optical apparatuses, which may allow others to see contents viewed by the user, resulting in leakage of the user's privacy.

In view of this, this specification provides an optical apparatus and a corresponding head-mounted device. The following is described in connection with embodiments. It should be noted that the proportions between the various elements shown in the various drawings are for illustration only and are not necessarily drawn at the true scale.

FIG. 1A is a schematic structural diagram of an optical apparatus according to an embodiment.

As shown in FIG. 1A, the optical apparatus 100 may include an image assembly 102, a first optical assembly 104, a second optical assembly 106, and a third optical assembly 108.

In FIG. 1A, for convenience of illustration and understanding, arrowed lines may be used to represent examples of the approximate propagation paths of the central beams of light of the various beams of light. It should be understood that in practice, the various beams may actually be a bundle of light, which may not necessarily propagate in one single direction.

The image assembly 102 may be used to emit the image light. For example, the image light may represent virtual images.

The image assembly 102, the first optical assembly 104, the second optical assembly 106, and the third optical assembly 108 may be arranged such that the image light follow a certain path into the user's eye 110.

For example, the image assembly 102, the first optical assembly 104, the second optical assembly 106, and the third optical assembly 108 may be arranged in order on the propagation path of the image light.

For example, the image assembly 102, the first optical assembly 104, the second optical assembly 106, and the third optical assembly 108 may be arranged such that the image light emitted by the image assembly 102 is transmitted through the first optical assembly 104 onto the second optical assembly 106, then reflected by the second optical assembly 106 onto the third optical assembly 108, then reflected by the third optical assembly 108 back to the second optical assembly 106 and transmitted through the second optical assembly 106 to enter the user's eye 110.

The second optical assembly 106 may be configured to block the interference light incident on the second optical assembly 106 from entering the user's eye 110.

The third optical assembly 108 may be configured to block the image light from being transmitted through the third optical assembly 108 to enter the external environment.

It could be understood that the interference light may come from various directions. However, in general, the interference light mainly coming from the direction as shown may cause more significant interference than the interference light from other directions, and thus avoiding the interference of the interference light from this direction can significantly enhance the imaging effect.

As can be seen from the above, in this embodiment, since the interference light may be blocked from entering the user's eye after passing through the second optical assembly 106. For example, the interference light may be reflected to an area outside the user's eye at the second optical assembly 106, or absorbed at the first optical assembly 104, such that no interference light enters the user's eye. The interference of the interference light in the image light and the ambient light can be avoided, and the imaging quality can be improved.

In addition, since the third optical assembly 108 blocks the image light from being transmitted through the third optical assembly 108 to enter the external environment, the leakage of the image light to the external environment can be avoided, and the user's privacy can be effectively protected.

In an embodiment, the first optical assembly 104 and the second optical assembly 106 may be arranged such that the interference light incident on the second optical assembly 106 is absorbed at the first optical assembly 104 after being transmitted through the second optical assembly 106. Thus, the interference light may be effectively prevented from entering the user's eye, which not only improves the imaging quality, but also improves the user experience.

In an embodiment, as shown in FIG. 1A, the third optical assembly 108 and the second optical assembly 106 may be arranged such that the ambient light incident on the third optical assembly 108 is sequentially transmitted through the third optical assembly 108 and the second optical assembly 106 to the user's eye. In this way, both the image light and the ambient light can enter the user's eye, such that the user can see an image in which the virtual image and the real scene are superimposed on each other, thereby achieving the AR effect.

In an embodiment, the first optical assembly 104 may only allow the light in a third polarization state to pass therethrough.

The second optical assembly 106 may convert the light in the third polarization state from the first optical assembly 104 to the second optical assembly 106 into light in the third polarization state to be incident on the third optical assembly 108, convert light in a fourth polarization state from the third optical assembly 108 to the second optical assembly 106 into light in a second polarization state to be incident on the user's eye 110, and convert the interference light incident on the second optical assembly 106 into light in the fourth polarization state to be incident on the first optical assembly 104.

The third optical assembly 108 may convert the light in the third polarization state from the second optical assembly 106 to the third optical assembly 108 into light in the fourth polarization state to be incident on the second optical assembly 106, and convert ambient light incident on the third optical assembly 108 into light in in fourth polarization state to be incident on the second optical assembly 106.

In this way, by effectively utilizing the polarization characteristics and optical characteristics of the respective optical components, the image light and the ambient light may be allowed to enter the user's eye without the interference light being reflected into the user's eye, so that the imaging effect can be improved, and the anti-interference capability can be enhanced, contributing to the improvement of the user experience.

It could be understood that, although the respective optical elements are represented by boxes in the respective drawings, the respective optical elements may have an arc plate shape or a flat plate shape, which is not limited herein.

In an embodiment, rotation directions of light in a third polarization state and a fourth polarization state may be opposite to each other. For example, the third polarization state may have a right-handed characteristic, while the fourth polarization state may have a left-handed characteristic. For example, the light in the third polarization state may be right-handed circularly polarized light or right-handed elliptically polarized light, while the light in the fourth polarization state may be left-handed circularly polarized light or left-handed elliptically polarized light.

In an embodiment, directions of vibration of light in a first polarization state and a second polarization state may be perpendicular to each other. For example, the light in the first polarization state and the second polarization state may be linearly polarized light. For example, the light in the first polarization state may be P polarized light, while the light in the second polarization state may be S polarized light. The directions of vibration of the P polarized light and the S polarized light may be perpendicular to each other.

Figure 1B:
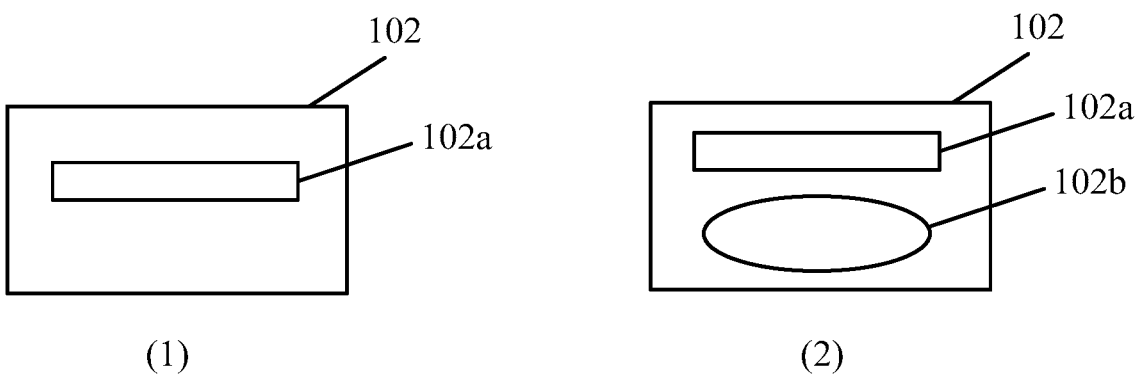
FIG. 1B is a schematic structural diagram of an image assembly according to an embodiment.

In an embodiment, as shown in FIG. 1B (1), the image assembly 102 may include an image source 102a. The image source 102a may emit image light. The image source 102a may be implemented using any suitable components known in the art. For example, the image source 102a may include a planar image source, such as an image source with an integrated light source or a unitary image source. For example, the image source 102a may be implemented using any device such as an Organic Light-Emitting Diode (OLED), a Liquid Crystal On Silicon (LCOS), a Liquid Crystal Display (LCD), a Microelectromechanical System (MEMS), a Digital Micro-mirror Device (DMD), or the like.

In an embodiment, as shown in FIG. 1B (2), the image assembly 102 may include an image source 102a and a lens 102b. The lens 102b may be used to converge image light.

Figure 1C:
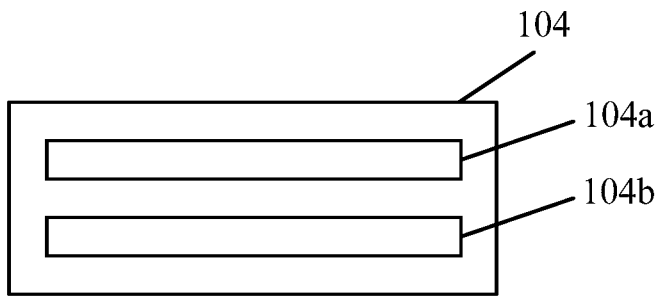
FIG. 1C is a schematic structural diagram of the first optical assembly according to an embodiment.

In an embodiment, as shown in FIG. 1C (1), the first optical assembly 104 may include a first polarizer 104a and a first wave plate 104b. The first polarizer 104a may be arranged on a side adjacent to the image assembly 102, while the first wave plate 104b may be arranged on a side adjacent to the second optical assembly 106.

The first polarizer 104a may allow the light having the first polarization state to pass therethrough and absorb the light having the second polarization state.

The first wave plate 104b may convert light between the first polarization state and the third polarization state, and between the second polarization state and the fourth polarization state. For example, the first wave plate may convert the light in the first polarization state to the light in the third polarization state, and may convert the light in the third polarization state to the light in the first polarization state, and may convert the light in the second polarization state to the light in the fourth polarization state, and may convert the light in the fourth polarization state to the light in the second polarization state.

For example, the first wave plate 104b may be any suitable wave plate known in the art, such as a quarter wave plate or a three-quarter wave plate. The quarter wave plate or the three-quarter wave plate may convert light between the first polarization state and the third polarization state, and between the second polarization state and the fourth polarization state. For example, referring to FIG. 1A, after the image assembly 102 emits an image light, the image light is first incident on the first polarizer 104a. Since the first polarizer 104a allows only the light in the first polarization state to pass therethrough, the image light is converted into image light in the first polarization state after passing through the first polarizer 104a, and may then be converted into image light in the third polarization state at the first wave plate 104b.

It could be understood that, in FIG. 1C, the first polarizer 104a and the first wave plate 104b are shown separated from each other for convenience of illustration. However, in specific implementations, the first polarizer 104a and the first wave plate 104b may be arranged in various suitable manners. For example, the first polarizer 104a and the first wave plate 104b may be attached together, or may be separated and relatively fixed by a mechanism member.

Figure 1D:
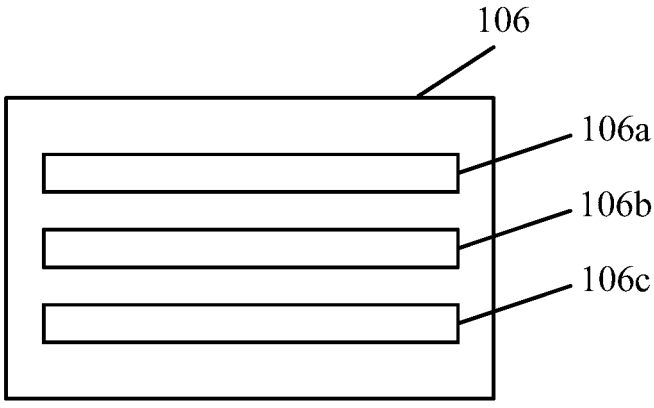
FIG. 1D is a schematic structural diagram of the second optical assembly according to an embodiment.

In an embodiment, as shown in FIG. 1D, the second optical assembly 106 may include a second wave plate 106a, a polarization beam splitter 106b, and a linear polarization element 106c. The second wave plate 106a may be arranged on a side adjacent to the first optical assembly 104, the linear polarization element 106c may be arranged on a side away from the first optical assembly 104, and the polarization beam splitter 106b may be arranged between the second wave plate 106a and the linear polarization element 106c.

Similar to the first wave plate 104a, the second wave plate 106a may convert light between the first polarization state and the third polarization state, and between the second polarization state and the fourth polarization state. For example, similar to the first wave plate 104a, the second wave plate 106a may convert the light in the first polarization state into the light in the third polarization state, and may convert the light in the third polarization state into the light in the first polarization state, and may convert the light in the second polarization state into the light in the fourth polarization state, and may convert the light in the fourth polarization state into the light in the second polarization state.

The second wave plate 106a may be any suitable wave plate known in the art. For example, the second wave plate 106a may be a quarter wave plate or a three-quarter wave plate.

The polarization beam splitter 106b may reflect the light in the first polarization state and may allow the light in the second polarization state to pass therethrough.

The linear polarization element 106c may only allow the light in the second polarization state to pass therethrough.

For example, referring to FIG. 1A, after passing through the first optical assembly 104, the image light may be converted into image light in the third polarization state. The image light in the third polarization state is incident on the second wave plate 106a, and is converted into image light in the first polarization state. Thereafter, the image light in the first polarization state is reflected at the polarization beam splitter 106b, and may reach the second wave plate 106a again. Thus, the image light in the first polarization state is converted into image light in the third polarization state by the second wave plate 106a, and the image light in the third polarization state will be incident on the third optical assembly 108.

It could be understood that, since the polarization beam splitter 106b reflects the light in the first polarization state, the image light may not reach the linear polarization element 106c.

Herein, the linear polarization element 106c mainly serves to prevent the interference light from reaching the user's eye. For example, referring to FIG. 1A, when the interference light is incident on the linear polarization element 106c from the direction shown in FIG. 1A, since the linear polarization element 106c allows only the light in the second polarization state to pass through, interference light from the linear polarization element 106c has the second polarization state. The interference light in the second polarization state may all be transmitted from the polarization beam splitter 106b, and may reach the second wave plate 106a. The second wave plate 106a may convert the interference light in the second polarization state into interference light in the fourth polarization state. Then, the interference light in the fourth polarization state may reach the first optical assembly 104. The first optical assembly 104 allows only the light in the third polarization state to pass through, and the interference light in the fourth polarization state may be absorbed at the first optical assembly 104. Thus, the interference light may be effectively prevented from entering the user's eye, which will disturb the imaging effect.

It could be understood that, in FIG. 1D, the second wave plate 106a, the polarization beam splitter 106b, and the linear polarization element 106c are shown as being separated from each other for convenience of illustration, but in a practical implementation, the second wave plate 106a, the polarization beam splitter 106b, and the linear polarization element 106c may be arranged in various suitable forms. For example, the second wave plate 106a, the polarization beam splitter 106b, and the linear polarization element 106c may be attached together, or may be separated from each other and relatively fixed by means of a mechanism member.

Figure 1E:
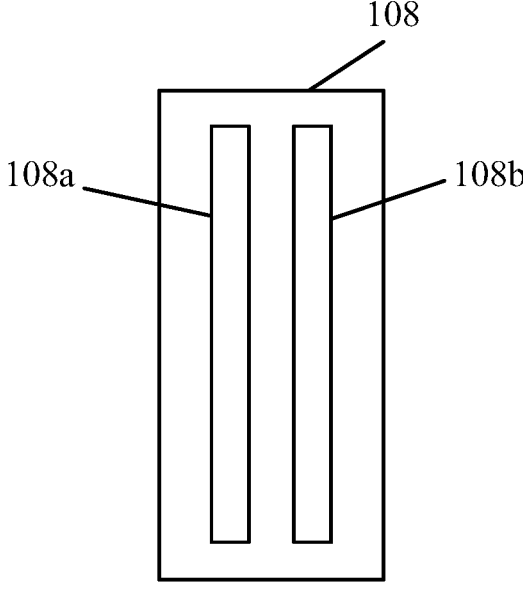
FIG. 1E is a schematic structural diagram of the third optical assembly according to an embodiment.

In an embodiment, as shown in FIG. 1E, the third optical assembly 108 may include a transflective element 108a and a circular polarization element 108b.

The transflective element 108a may be arranged on a side adjacent to the second optical assembly 106, and the circular polarization element 108b may be arranged on a side away from the second optical assembly 106.

The transflective element may partially reflect and partially transmit light incident on itself. The circular polarization element 108b is arranged such that the light in the fourth polarization state passes therethrough and the light in the third polarization state is absorbed.

For example, referring to FIG. 1A, the image light reflected by the second optical assembly 106 has the third polarization state, and when the image light in the third polarization state reaches the transflective element 108a, the image light is partially reflected and partially transmitted through the transflective element 108a. The reflected image light has the fourth polarization state, and the transmitted image light still has the third polarization state. After the transmitted image light in the third polarization state reaches the circular polarization element 108b, the circular polarization element 108b only allows the light in the fourth polarization state to pass therethrough, and the image light in the third polarization state may be absorbed at the circular polarization element 108b, so as to prevent the image light from leaking to the external environment, thereby effectively protecting the user's privacy.

In an embodiment, the circular polarization element 108b may include a second polarizer and a third wave plate. The third wave plate may be arranged on a side adjacent to the transflective element 108a, and the second polarizer may be arranged on a side away from the transflective element 108a.

The second polarizer is arranged such that the light in the second polarization state passes therethrough and the light in the first polarization state is absorbed.

The third wave plate may convert light between the second polarization state and the fourth polarization state, and between the first polarization state and the third polarization state. For example, the third wave plate may convert the light in the first polarization state to the light in the third polarization state, the light in the third polarization state to the light in the first polarization state, the light in the second polarization state to the light in the fourth polarization state, and the light in the fourth polarization state to the light in the second polarization state.

The third wave plate may be any suitable wave plate in the art. For example, the third wave plate may be a quarter wave plate or a three-quarter wave plate.

For example, referring to FIG. 1A and FIG. 1E, image light in the third polarization state transmitted through the transflective element 108a reaches the third wave plate, and the image light may be converted into image light in the first polarization state. The second polarizer may only allow the light in the second polarization state to pass therethrough, and the image light in the first polarization state may be absorbed at the second polarizer, so as to prevent the image light from leaking to the external environment, thereby effectively protecting the user's privacy.

In an embodiment, image light may be incident on the second optical assembly 106 at a first angle, and may exit the second optical assembly 106 at a second angle.

Typically, wave plates may be fabricated at normal incidence. Thus, in this embodiment, the thickness and size of the second wave plate may be determined based on the first angle and the second angle.

In an embodiment, the center normal of the image assembly 102 and the center normal of the first optical assembly 104 may be consistent. For example, the image assembly 102 and the first optical assembly 104 may appear to be positioned parallel to each other. For example, the center of a light emitting area of the image source 102a included in the image assembly 102 is passed through by the optical axis of a lens 102b included in the image assembly 102, while the optical axis of the first optical assembly 104 and the optical axis of the lens 102b are consistent.

The direction of the center normal of the third optical assembly 108 may be the same as the direction of the central light of the image light incident on the third optical assembly 108. For example, it may be understood that the central light of the image light may be incident on the third optical assembly 108 at normal incidence.

For example, in an embodiment, the image assembly 102 and the first optical assembly 104 may appear to be positioned substantially parallel to each other, and the second optical assembly 106 may be positioned at an angle to the first optical assembly 102, such as ranging from 20° to 70° between the center normal of the first optical assembly 102 and the center normal of the second optical assembly 104.

In addition, it may be understood that the image assembly 102 and the first optical assembly 104 are shown separated from each other in FIG. 1A for convenience of illustration, but the first optical assembly 104 and the image assembly 102 may be arranged in a variety of suitable manners in specific implementations. For example, the first optical assembly 104 and the image assembly 102 may be attached together, or may be secured relative to the image assembly 102 by some suitable mechanism member.

Figure 2A:
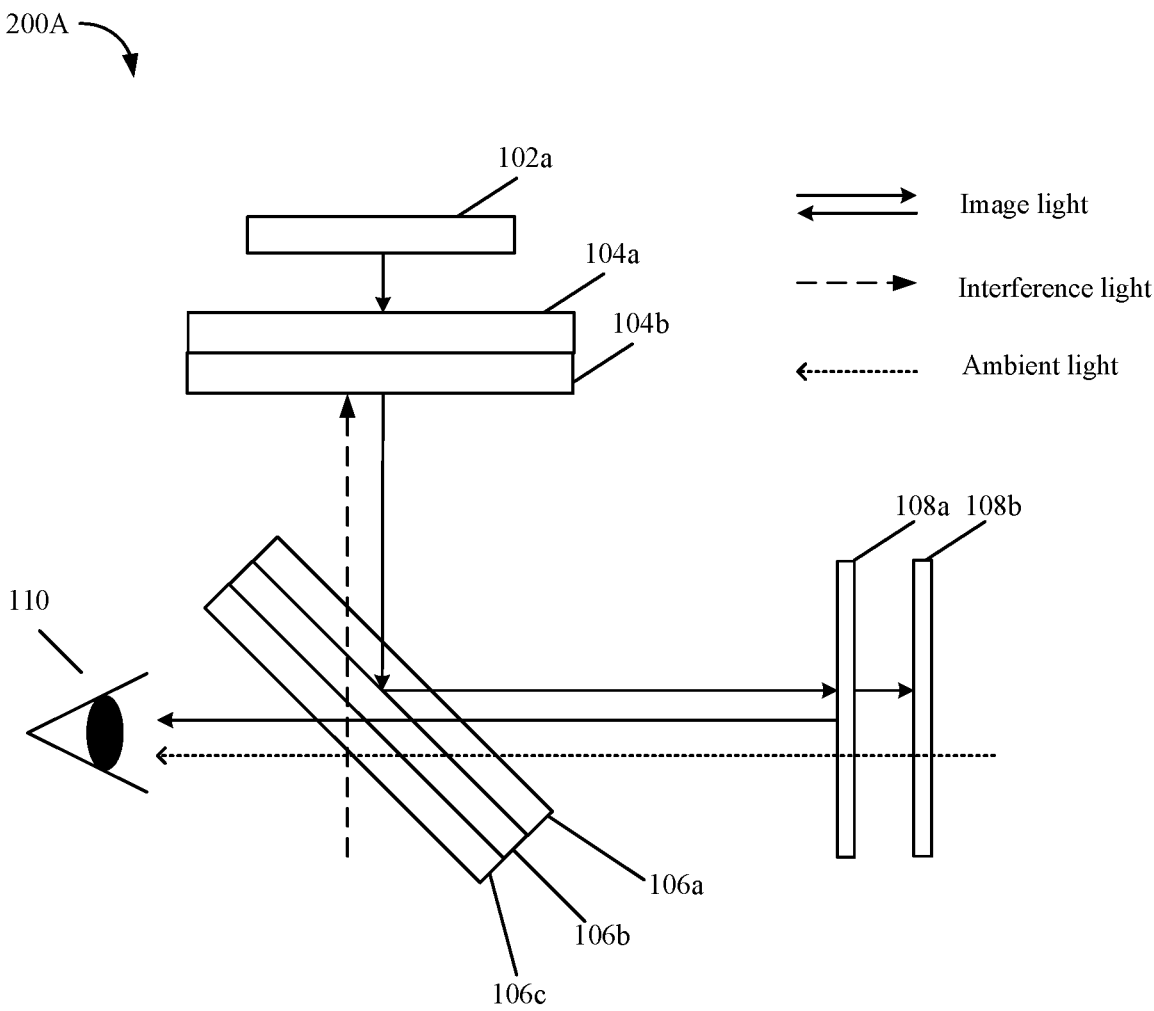
FIGS. 2A-2C are schematic structural diagrams of an optical apparatus according to different embodiments.
Figure 2B:
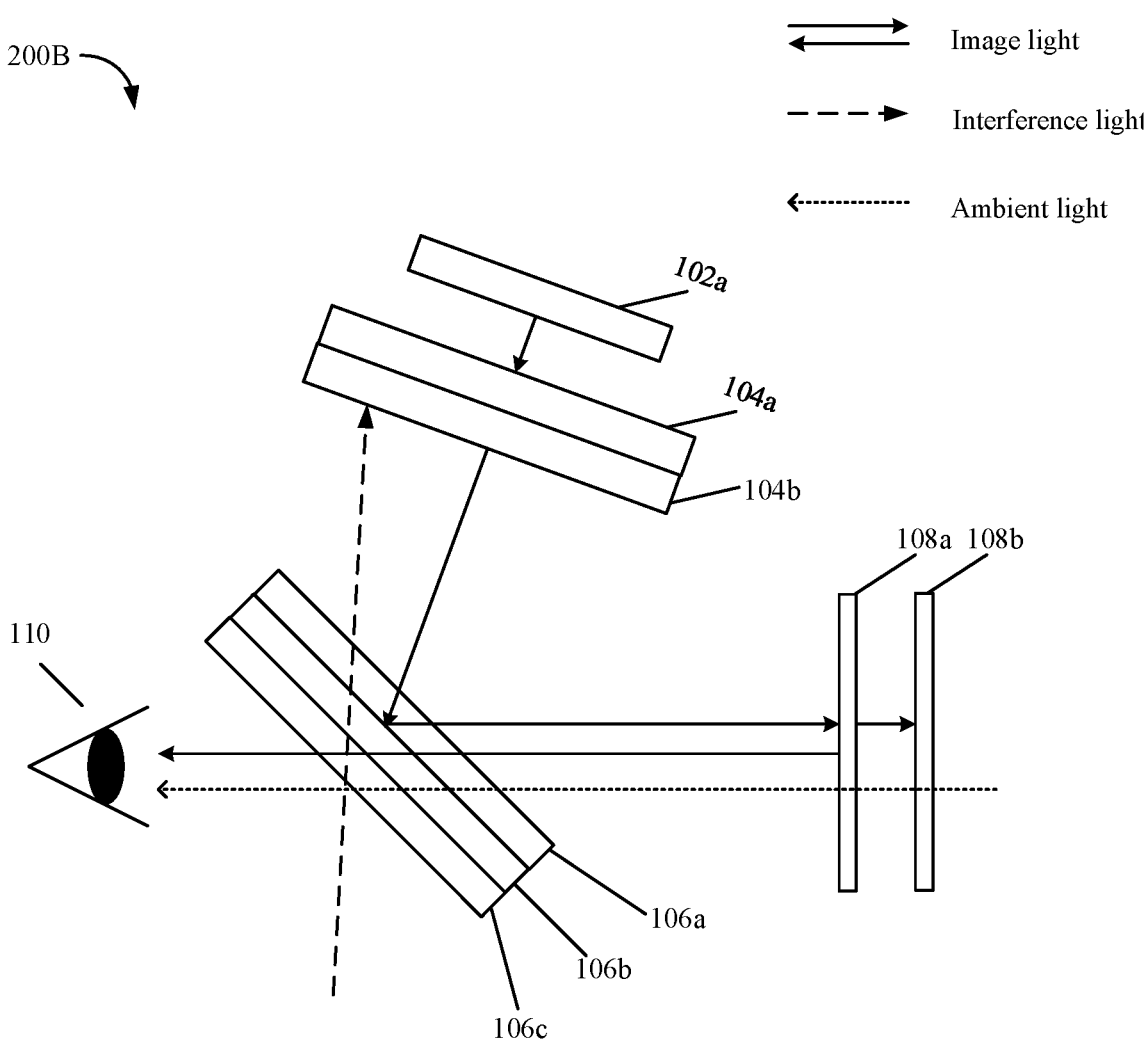
Figure 2C:
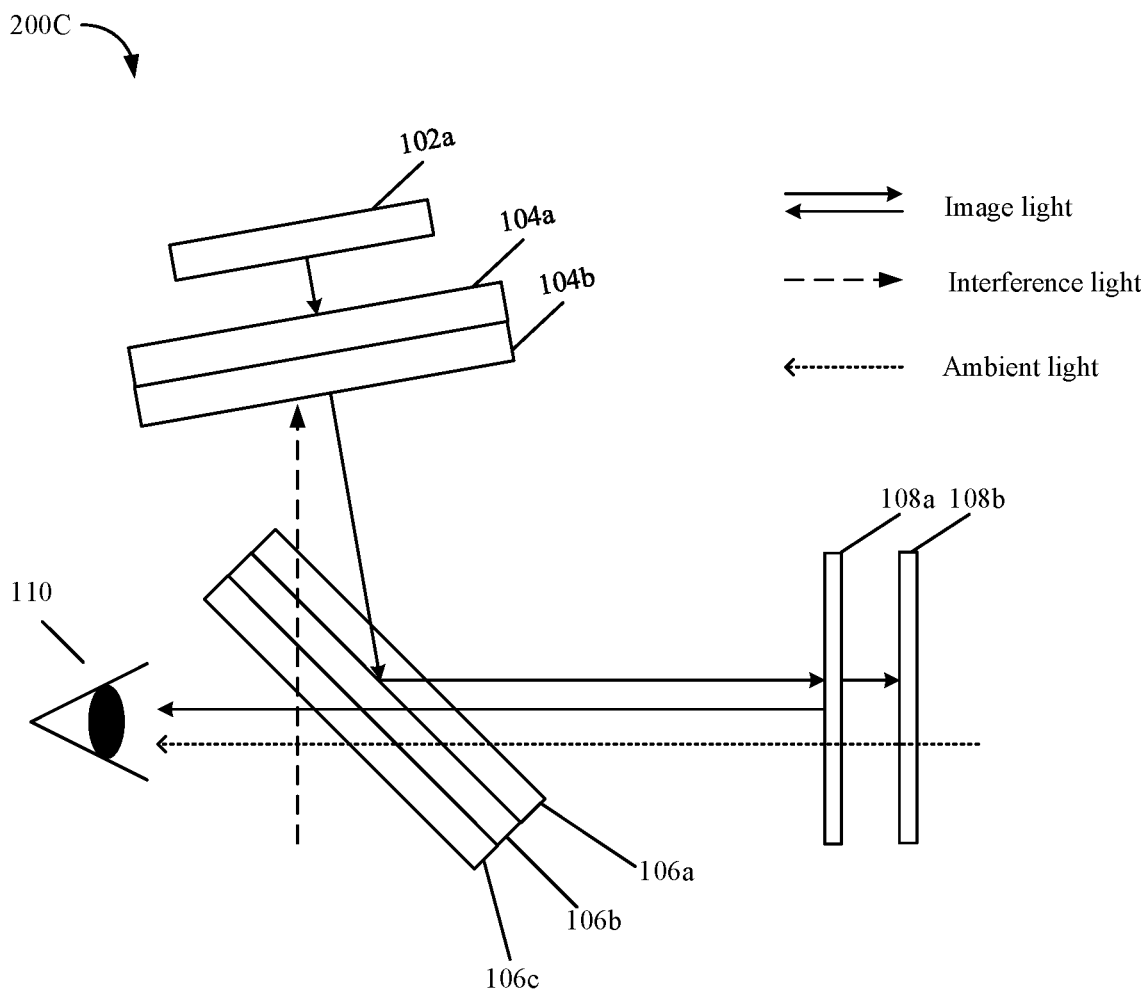

FIGS. 2A-2C illustrate schematic structural diagrams of optical apparatuses in accordance with various embodiments. It may be understood that the examples of optical apparatuses shown in FIGS. 2A-2C are merely for assisting those skilled in the art in better understanding the technical solution of this Specification, and do not limit the scope thereof.

First, a description will be given with reference to the example shown in FIG. 2A.

As previously described, the optical apparatus 200A may transmit image light and ambient light into the user's eye 110. In addition, interference light from the external environment may be incident on the optical apparatus. The optical apparatus 200A will be described in connection with the propagation paths of the image light, the ambient light, and the interference light. For convenience of description and understanding, in FIG. 2A, approximate propagation paths of the central light of the image light, the central light of the interference light, and the central light of the ambient light are illustrated as examples.

First, the propagation paths of the image light in the optical apparatus 200A will be described.

An image source 102a emits image light. The image light is first incident perpendicularly on a first polarizer 104a. Since the first polarizer 104a allows only the light in the first polarization state to pass therethrough, image light transmitted by the first polarizer 104a has the first polarization state.

The image light in the first polarization state continues to be incident on a first wave plate 104b to be converted into image light in the third polarization state. The image light in the third polarization state transmitted through the first wave plate 104b continues to be incident on a second wave plate 106a to be converted into image light in the first polarization state.

The image light in the first polarization state transmitted through the second wave plate 106a propagates to a polarization beam splitter 106b to be reflected by the polarization beam splitter 106b, then to be incident on the second wave plate 106a again, such that the image light in the first polarization state is converted into image light in the third polarization state by the second wave plate 106a.

The image light in the third polarization state propagates to a transflective element 108a to be partially reflected and partially transmitted through the transflective element 108a.

Image light partially reflected by the transflective element 108a has the fourth polarization state which is converted into the second polarization state after reaching the second wave plate 106a. The image light in the second polarization state transmitted through the second wave plate 106a is transmitted through the polarization beam splitter 106b to further be transmitted through a linear polarization element 106c to enter the user's eye 110.

The image light partially transmitted through the transflective element 108a propagates to a circular polarization element 108b, and still has a third polarization state. Since the circular polarization element 108b only allows light in the fourth polarization state to pass through and absorbs light in the third polarization state, image light partially transmitted through the transflective element 108a is absorbed at the circular polarization element 108b. Thus, the image light can be effectively prevented from leaking to the external environment, thereby protecting the user's privacy.

A propagation path of ambient light in the optical apparatus 200A will be described below.

The ambient light is incident on the circular polarization element 108b. Ambient light in exiting the circular polarization element 108b has the fourth polarization state because the circular polarization element 108b allows only light in the fourth polarization state to pass therethrough. The ambient light in the fourth polarization state is partially transmitted through the transflective element 108a, such that the polarization state of the transmitted ambient light remains unchanged.

The ambient light in the fourth polarization state transmitted through the transflective element 108a propagates to the second wave plate 106a to be converted into ambient light in the second polarization state. The ambient light in the second polarization state is transmitted through the polarization beam splitter 106b and the linear polarization element 106c to enter the user's eye.

Thus, the user's eye can see the superimposed image of the real scene and the virtual image, thereby achieving the AR effect.

A propagation path of the interference light in the optical apparatus 200A will be described below.

The interference light is incident on the linear polarization element 106c. Since the linear polarization element 106c only allows the light in the second polarization state to pass through, the interference light transmitted through the linear polarization element 106c has the second polarization state.

The interference light in the second polarization state will all be transmitted through the polarization beam splitter 106b and propagate to the second wave plate 106A. Thus, since the interference light passes through the polarization beam splitter 106b but not be reflected, there will be no interference light entering the user's eye 110, so that the interference of the interference light to the imaging effect can be effectively avoided and the anti-interference capability of the optical apparatus 200A can be enhanced.

The second wave plate 106a converts the interference light in the second polarization state into the interference light in the fourth polarization state. The interference light in the fourth polarization state continues to propagate to the first wave plate 104b.

The first wave plate 104b converts the interference light in the fourth polarization state into the interference light in the second polarization state.

Since the first polarizer 104a allows only the light in the first polarization state to pass through, the interference light in the second polarization state is absorbed at the first polarizer 104a.

In this embodiment, since the interference light propagates to the first polarizer 104a and is then absorbed by the first polarizer 104a after being incident on the linear polarization element, the interference light does not enter the user's eye, so that the interference light can be prevented from interfering with the image light and the ambient light, and the imaging quality can be improved. In addition, since the circular polarization element 108b can block the image light incident thereon from entering the external environment, the leakage of the image light to the external environment can be prevented and the user's privacy can be effectively protected.

In addition, it should be noted that, in a case that the optical apparatus 200A further includes a lens 102b, distances between the image source 102*a* and the second wave plate 106*a* as well as the polarization beam splitter 106*b* should satisfy a certain optical design.

It should be understood that, although the first polarizer 104*a* and the first wave plate 104*b* are shown as being attached together in FIG. 2A, in various embodiments, the first polarizer 104*a* and the first wave plate 104*b* may be separately arranged and relatively fixed by corresponding mechanical structures.

In addition, although the second wave plate 106*a*, the polarization beam splitter 106*b* and the linear polarization element 106*c* are shown as being attached together in FIG. 2A, in various embodiments, the second wave plate 106*a*, the polarization beam splitter 106*b* and the linear polarization element 106*c* may be separately arranged and relatively fixed by corresponding mechanical structures.

In addition, although the image source 102*a*, the first polarizer 104*a* and the first wave plate 104*b* are shown as being attached together in FIG. 2A, in various embodiments, the image source 102*a* may be attached with the first polarizer 104*a* and the first wave plate 104*b*.

In addition, although the transflective element 108*a* and the circular polarization element 108*b* are shown as being separately arranged in FIG. 2A, in various embodiments, the transflective element 108*a* and the circular polarization element 108*b* may be attached together.

There is no limitation on these specific arrangements in this Specification.

In addition, it could be understood that, in FIG. 2A, although the image source 102*a*, the first polarizer 104*a* and the first wave plate 104*b* are shown to be substantially perpendicular to the transflective element 108*a* and the circular polarization element 108*b*, other arrangements can be adopted in different embodiments. In different arrangements, the image source 102*a*, the first polarizer 104*a* and the first wave plate 104*b* can all be arranged substantially in parallel, while the direction of the central normal of the transflective element 108*a* and the circular polarization element 108*b* can be substantially consistent with the direction of the central light of image light incident thereon. For example, it can be understood that the central light of the image light can be substantially perpendicular to both the transflective element 108*a* and the circular polarization element 108*b*.

For example, two examples of various arrangements of the optical elements are illustrated in FIGS. 2B-2C.

In the examples shown on FIGS. 2B-2C, the propagation paths of the image light, the ambient light and the interference light are similar to those in the example of FIG. 2A, and are not described herein for convenience of description.

In the example of FIG. 2B, an image source 102*a*, a first polarizer 104*a*, and a first wave plate 104*b* may form an acute angle with both a transflective element 108*a* and a circular polarization element 108*b*. It can be understood that in the example shown in FIG. 2B, the center normal of the image source 102*a*, the first polarizer 104*a* and the first wave plate 104*b* can be consistent with each other, which can also be understood that the three are substantially arranged in parallel. In addition, the direction of the central normal of both the transflective element 108*a* and the circular polarization element 108*b* can be consistent with the direction of the central light of the image light incident thereon, which can also be understood as that the central light of the image light is substantially perpendicularly incident on both the transflective element 108*a* and the circular polarization element 108*b*.

In the example of FIG. 2C, an image source 102*a*, a first polarizer 104*a*, and a first wave plate 104*b* may form an obtuse angle with both a transflective element 108*a* and a circular polarization element 108*b*. It can be understood that in the example of FIG. 2B, the center normal of the image source 102*a*, the first polarizer 104*a*, and the first wave plate 104*b* can be consistent, which can also be understood that the three are substantially arranged in parallel. In addition, the directions of the central normals of both the transflective element 108*a* and the circular polarization element 108*b* can be consistent with the direction of the central light of the incident image light, which can also be understood as that the central light of the image light is substantially perpendicularly incident on both the transflective element 108*a* and the circular polarization element 108*b*.

In an embodiment, an optical apparatus may include: an image assembly configured to emit image light; a first polarizer configured to receive the image light emitted by the image assembly and transmit the image light in a first polarization state; a first wave plate configured to receive the image light in the first polarization state transmitted through the first polarizer and transmit the image light in a third polarization state; a second wave plate configured to receive the image light in the third polarization state transmitted through the first wave plate and transmit the image light in the first polarization state; a polarization beam splitter configured to receive the image light in the first polarization state transmitted through the second wave plate and reflect the image light in the first polarization state, the image light in the first polarization state reflected by the polarization beam splitter passes through the second wave plate and the image light in the third polarization state is transmitted; a transflective element configured to receive the image light in the third polarization state transmitted through the second wave plate and reflect the image light in a fourth polarization state, the image light in the fourth polarization state reflected by the transflective element is converted into the image light in a second polarization state through the second wave plate, and the image light in the second polarization state enters the user's eye through the polarization beam splitter; wherein after ambient light passes through the transflective element, the second wave plate, and the polarization beam splitter in turn, the ambient light in the second polarization state enters the user's eye; wherein rotation directions of the third polarization state and the fourth polarization state are opposite, and directions of the first polarization state and the second polarization state are perpendicular to each other.

In an embodiment, the first polarizer and the first wave plate are attached together, and the first polarizer is arranged on a side adjacent to the image assembly, the second wave plate and the polarization beam splitter are attached together, and the second wave plate is arranged on a side adjacent to the first wave plate, the transflective element is arranged on a side adjacent to the second wave plate.

In an embodiment, the optical apparatus further includes a linear polarization element attached to a side of the polarization beam splitter away from the second wave plate, the linear polarization element is configured to only allow the light in the second polarization state to pass therethrough.

In an embodiment, the optical apparatus further includes a circular polarization element attached to a side of the transflective element away from the second wave plate, and the circular polarization element is configured to enable the light in the fourth polarization state to pass therethrough and the light in the third polarization state to be absorbed.

In an embodiment, the image assembly is arranged parallel to the first polarizer and the first wave plate, and the transflective element is arranged at an obtuse or acute angle with the image assembly.

Figure 3:
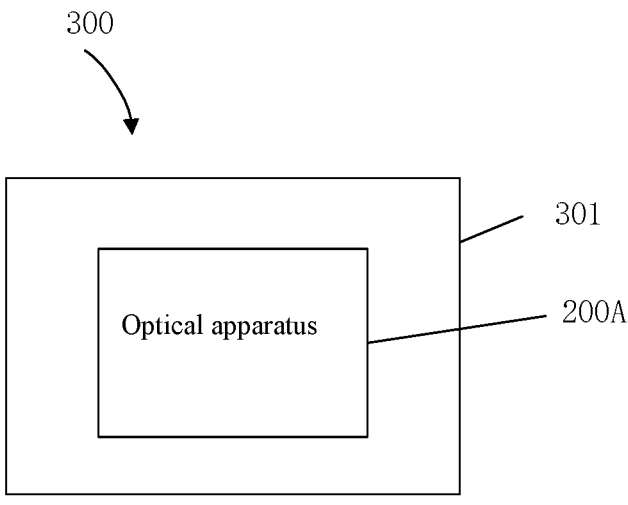
FIG. 3 is a schematic structural diagram of a head-mounted device according to an embodiment.

In the example shown in FIG. 3, a head-mounted device 300 includes a housing 301 and optical apparatuses 200A, 200B, 200C (see FIGS. 2A to 2C) accommodated in the housing 301. For example, the housing 301 may have a helmet shape or an eyeglass shape.

The optical apparatus may include an image assembly, a first optical assembly, a second optical assembly, and a third optical assembly. The image assembly is configured to emit image light, and the first optical assembly is arranged parallel to the image assembly to enable the first optical assembly to receive the image light emitted from the image assembly. The image light transmitted through the first optical assembly is incident on the second optical assembly at a first angle, and the image light is transmitted through the second optical assembly at a second angle; interference light is incident on the second optical assembly and propagates toward the first optical assembly to be absorbed by the first optical assembly; the image light transmitted through the second optical assembly is reflected by the third optical assembly and then transmitted through the second optical assembly again to enter the user's eye, and the third optical assembly blocks the image light from being transmitted through the third optical assembly to enter an external environment; wherein ambient light enters the user's eye through the third optical assembly and the second optical assembly in turn.

Further, the optical apparatuses 100 or 200A-200C in this specification may be applied to the head-mounted device 300. For example, the head-mounted device 300 may have a helmet shape or an eyeglass shape. For example, an example of the head-mounted device 300 may be an AR device. For example, an AR device may include the optical apparatuses described in any one of the embodiments shown in FIGS. 1A to 2C. The AR device may also include a clip that may secure the AR device to a head, ear, or the like of a user.

The term "example" used throughout this Specification, means used as an "example, instance, or illustration", and does not mean "preferable" or "advantageous" over other embodiments. Specific details are included in the embodiment for the purpose of providing an understanding of the described technology. However, the technology may be implemented without such specific details. In some instances, well-known structures and devices are shown in diagram in order to avoid obscuring the concept of the embodiments described.

The alternative embodiments of the present disclosure are described above in detail with reference to the drawings, but the embodiments of the present disclosure are not limited to the specific details of the embodiments described above, and various modifications may be made to the technical solutions of the embodiments of the present disclosure within the scope of the technical concept of the embodiments of the present disclosure, and these modifications are all under the protection scope of the embodiments of the present disclosure.

The foregoing description of the present disclosure is provided to enable any PHOSITA to exploit or use the present disclosure. Various modifications to the present disclosure will be readily apparent to the PHOSITA, and the generic principles defined herein may be applied to other modifications without departing from the protection scope of the present disclosure. Thus, the present disclosure is not limited to the examples and designs described herein, but is to be accorded with the widest scope consistent with the principles and novel features disclosed herein.

The invention claimed is:

1. An optical apparatus comprising:
an image assembly, a first optical assembly, a second optical assembly, and a third optical assembly, wherein:
the image assembly configured to emit image light,
the image assembly, the first optical assembly, the second optical assembly, and the third optical assembly are configured to enable that the image light is transmitted through the first optical assembly to the second optical assembly, then reflected by the second optical assembly to the third optical assembly, then reflected by the third optical assembly back to the second optical assembly and transmitted through the second optical assembly to enter a user's eye;
the second optical assembly configured to avoid interference light incident on the second optical assembly from entering the user's eye; and
the third optical assembly configured to avoid the image light from being transmitted through the third optical assembly into an external environment,
wherein
the first optical assembly is configured to enable light in a first polarization state to pass therethrough and light in a second polarization state to be absorbed, and
the second optical assembly is configured to enable the light in the second polarization state to pass therethrough and the light in the first polarization state to be reflected, wherein
directions of light in the first polarization state and the second polarization state are perpendicular to each other.

2. The optical apparatus of claim 1, wherein the first optical assembly and the second optical assembly are configured to enable that the interference light incident on the second optical assembly is absorbed at the first optical assembly after being transmitted through the second optical assembly.

3. The optical apparatus of claim 1, wherein the third optical assembly and the second optical assembly are configured to enable that ambient light incident on the third optical assembly is transmitted through the third optical assembly and the second optical assembly sequentially into the user's eye.

4. The optical apparatus of claim 1, wherein
the first optical assembly is configured to allow light in a third polarization state to pass therethrough;
the second optical assembly is configured to convert the light in the third polarization state transmitted through the first optical assembly to the second optical assembly into the light in the third polarization state to be incident on the third optical assembly, light in a fourth polarization state transmitted through the third optical assembly to the second optical assembly into light in the second polarization state to enter the user's eye, and the interference light incident on the second optical assembly into the light in the fourth polarization state to be incident on the first optical assembly; and
the third optical assembly is configured to convert the light in the third polarization state transmitted through the second optical assembly to the third optical assembly into the light in the fourth polarization state to be incident on the second optical assembly, and ambient light incident on the third optical assembly into the light in the fourth polarization state to be incident on the second optical assembly, wherein rotational directions of light in the third polarization state and the fourth polarization state are opposite to each other.

5. The optical apparatus of claim 4, wherein the first optical assembly comprises a first polarizer and a first wave plate, wherein the first polarizer is arranged on a side adjacent to the image assembly, and the first wave plate is arranged on a side adjacent to the second optical assembly;

the first polarizer is configured to enable the light in the first polarization state to pass therethrough and the light in the second polarization state to be absorbed, and the first wave plate is configured to convert the light in the first polarization state into the light in the third polarization state, the light in the third polarization state into the light in the first polarization state, the light in the second polarization state into the light in the fourth polarization state, and the light in the fourth polarization state into the light in the second polarization state.

6. The optical apparatus of claim 4, wherein the second optical assembly comprises a second wave plate, a polarization beam splitter, and a linear polarization element, wherein the second wave plate is arranged on a side adjacent to the first optical assembly, the linear polarization element is arranged on a side away from the first optical assembly, and the polarization beam splitter is arranged between the second wave plate and the linear polarization element, the second wave plate is configured to convert the light in the first polarization state into the light in the third polarization state, the light in the third polarization state into the light in the first polarization state, the light in the second polarization state into the light in the fourth polarization state, and the light in the fourth polarization state into the light in the second polarization state, the polarization beam splitter is configured to enable the light in the second polarization state to pass therethrough and the light in the first polarization state to be reflected, and the linear polarization element is configured to enable only the light in the second polarization state to pass therethrough.

7. The optical apparatus of claim 6, wherein the image light is incident on the second optical assembly at a first angle, and the image light exits the second optical assembly at a second angle, wherein a thickness and size of the second wave plate is determined based on the first angle and the second angle.

8. The optical apparatus of claim 4, wherein the third optical assembly comprises a transflective element and a circular polarization element, wherein the transflective element is arranged on a side adjacent to the second optical assembly, and the circular polarization element is arranged on a side away from the second optical assembly;

the transflective element is configured to partially reflect and partially transmit incident light; and the circular polarization element is configured to enable the light in the fourth polarization state to pass therethrough and the light in the third polarization state to be absorbed.

9. The optical apparatus of claim 8, wherein the circular polarization element comprises a second polarizer and a third wave plate, wherein the third wave plate is arranged on a side adjacent to the transflective element, and the second polarizer is arranged on a side away from the transflective element;

the second polarizer is configured to enable the light in the second polarization state to pass therethrough and the light in the first polarization state to be absorbed, and the third wave plate is configured to convert the light in the first polarization state into the light in the third polarization state, the light in the third polarization state into the light in the first polarization state, the light in the second polarization state into the light in the fourth polarization state, and the light in the fourth polarization state into the light in the second polarization state.

10. The optical apparatus of claim 1, wherein the image assembly comprises an image source, or the image assembly comprises an image source and a lens.

11. The optical apparatus of claim 1, wherein central normals of the image assembly and the first optical assembly are consistent, and a direction of a central normal of the third optical assembly is consistent with a direction of central light of the image light incident on the third optical assembly.

12. The optical apparatus of claim 5, wherein the first polarizer and the first wave plate are attached together.

13. The optical apparatus of claim 1, wherein the first optical assembly is arranged in parallel to the image assembly, the image assembly and the third optical assembly are arranged perpendicular to each other, and an angle between a central normal of the first optical assembly and a central normal of the second optical assembly is from 20° to 70°.

14. The optical apparatus of claim 6, wherein the second wave plate and the linear polarization element are attached to both sides of the polarization beam splitter.

15. An optical apparatus comprising:

an image assembly configured to emit image light;

a first polarizer configured to receive the image light emitted by the image assembly and enable light in a first polarization state to pass therethrough and light in a second polarization state to be absorbed, wherein directions of light in the first polarization state and the second polarization state are perpendicular to each other;

a first wave plate configured to receive the image light in the first polarization state from the first polarizer and transmit the image light in a third polarization state, wherein the first wave plate is configured to convert the light in the first polarization state into the light in the third polarization state, and convert the light in the third polarization state into the light in the first polarization state, a second wave plate configured to receive the image light in the third polarization state from the first wave plate and convert the image light in the third polarization state into the first polarization state;

a polarization beam splitter configured to receive the image light in the first polarization state converted by the second wave plate and reflect the image light in the first polarization state, wherein the polarization beam splitter is configured to enable the light in the second polarization state to pass through; and a transflective element configured to receive the image light in the third polarization state from the second wave plate, and allow the image light in the third polarization state to pass through, wherein the transflective element is configured to reflect the image light in a fourth polarization state, a side adjacent to the transflective element, and the second polarizer is arranged on a side away from the transflective element;

wherein rotation directions of the light in the third polarization state and the fourth polarization state are opposite, wherein the second wave plate is further configured to convert the image light in the fourth polarization state reflected by the transflective element into the image light in the second polarization state, wherein the polarization beam splitter is further configured to allow the image-light in the second polarization state to enter the user's eye therethrough; wherein after ambient light passes through the transflective element, the second wave plate, and the polarization beam splitter in turn, the ambient light in the second polarization state enters the user's eye.

16. The optical apparatus of claim 15, the optical apparatus further includes a linear polarization element attached to a side of the polarization beam splitter away from the second wave plate, the linear polarization element is configured to allow the light in the second polarization state to pass therethrough and reflect the light in the first polarization state.

17. The optical apparatus of claim 16, wherein the linear polarization element is configured to allow interference light incident thereon in the second polarization state to pass through;

the polarization beam splitter is configured to transmit the interference light in the second polarization state;

the second wave plate is configured to convert the interference light in the second polarization state into the interference light in the fourth polarization state;

the first wave plate is configured to convert the interference light in the fourth polarization state into the interference light in the second polarization state; and the first polarizer is configured to absorb the interference light in the second polarization state.

18. A head-mounted device comprising an optical apparatus, wherein the head-mounted device has a helmet shape or an eyeglass shape, and the optical apparatus comprises:

an image assembly configured to emit image light;

a first optical assembly comprising:

a first polarizer having a first side adjacent to the image assembly and a second side away from the image assembly, and configured to allow light in a first polarization state to pass through and light in a second polarization state to be absorbed, a first wave plate having a first side adjacent to the first polarizer and a second side away from the first polarizer;

a second optical assembly comprising:

a second wave plate having a first side adjacent to the second side of the first wave plate and a second side away from the second side of the first wave plate, a polarization beam splitter having a first side adjacent to the second side of the second wave plate and a second side away from the second side of the second wave plate, a linear polarization element arranged adjacent to the second side of polarization beam splitter, wherein the first optical assembly is configured to convert light incident on the first optical assembly into light in a third polarization state, the second optical assembly is configured to convert interference light incident on the second optical assembly into interference light in a fourth polarization state to be incident on the first optical assembly, the first wave plate is configured to convert interference light in the fourth polarization state into interference light in the second polarization state, the first polarizer is configured to absorb interference light in the second polarization state, and rotation directions of light in the third polarization state and light in the fourth polarization state are opposite; and a third optical assembly comprising:

a transflective element configured to receive light transmitted through the second wave plate and reflect light back to the second wave plate.

19. The head-mounted device of claim 18, wherein the optical apparatus further comprises a circular polarization element arranged on a side of the transflective element away from the second wave plate, and the circular polarization element is configured to enable the light in the fourth polarization state to pass therethrough and the light in the third polarization state to be absorbed.

20. The head-mounted device of claim 19, wherein the circular polarization element comprises a second polarizer and a third wave plate, wherein the third wave plate is arranged on a side adjacent to the transflective element, and the second polarizer is arranged on a side away from the transflective element;

the second polarizer is configured to enable the light in the second polarization state to pass therethrough and the light in the first polarization state to be absorbed, and the third wave plate is configured to convert the light in the first polarization state to the light in the third polarization state, the light in the third polarization state to the light in the first polarization state, the light in the second polarization state to the light in the fourth polarization state, and the light in the fourth polarization state to the light in the second polarization state.

* * * * *